March 7, 1961 E. S. THALL 2,973,969
ELECTRICAL SHOCK ABSORBING SYSTEM
Filed May 11, 1955 2 Sheets-Sheet 1

INVENTOR
Earle S. Thall
BY Albert Rosen
ATTORNEY

March 7, 1961  E. S. THALL  2,973,969
ELECTRICAL SHOCK ABSORBING SYSTEM

Filed May 11, 1955  2 Sheets-Sheet 2

INVENTOR.
Earle S. Thall
BY *Albert Rosen*
ATTORNEY

United States Patent Office 2,973,969
Patented Mar. 7, 1961

2,973,969
ELECTRICAL SHOCK ABSORBING SYSTEM
Earle S. Thall, 299 St. Cloud Ave., West Orange, N.J.
Filed May 11, 1955, Ser. No. 507,639
9 Claims. (Cl. 280—124)

My invention relates to improvements in shock absorbing systems and has especial reference to a vehicular shock absorbing system for stabilizing a vehicle as a whole when any of the vehicle support members, such as a wheel or a tread, experiences a shock.

When a portion of a moving vehicle, such for example as a front wheel of an automobile, hits a bump in a road the wheel is pushed upward. The upward motion is transmitted to the automobile frame as a shock which causes the rear of the automobile to pitch downward. As is known, a loose coupling between an automobile frame and a wheel will allow the wheel to move relative to the frame without transmitting much of its motion to the latter, while a tight wheel-frame coupling will cause the two to move as a unit. Consequently, when a front wheel hits a bump in a road a loose front wheel-to-frame coupling and a tight rear wheel-to-frame coupling is desired. The tight rear wheel-to-frame coupling prevents the frame from pitching downward relative to the rear wheels, the rear wheels being pitch resistant by virtue of their contact with the road. However, at the same time it is desirable to have the reverse true when a rear wheel of the automobile hits a bump—a loose coupling at the rear and a tight coupling at the front.

In a similar manner, during hard acceleration the automobile driving-axle thrust is transmitted to the frame causing the front of the automobile to pitch upward; during hard braking the rear pitches upward. Again, tight wheel-frame coupling at the appropriate places would tend to resist these pitching tendencies but at the expense of making the automobile less resistant to shock.

If, as is conventional, a separate, independent shock absorber is used at each wheel, the wheel-frame coupling through the shock absorber is chosen as a compromise between resistance to shock and resistance to pitch, springs being relied upon to soften the effect of shock. A vehicle so equipped is vulnerable to both shock as well as pitch. Mechanical connections between widely separated portions of a vehicle, such as torsion bars, have been used to reduce both shock and pitch. (A torsion bar comprises a member connected at one end thereof to a wheel and at the other end thereof either to the vehicle frame or to another wheel on the same side of the vehicle but at the opposite end thereof, the bar transmitting some of the vertical wheel motion due to a road bump to respectively the vehicle frame or the other wheel in the form of torsion instead of as a vertically directed force at the opposite side end of the automobile.) The use of such mechanical connections has not proven satisfactory in eliminating the aforementioned pitching tendencies since relatively massive members are needed to transmit the forces involved, and other factors inherent in a shock absorbing system using mechanically interconnected members, such as increased weight, must be tolerated. Also, the mechanically interconnected members have not been effective to prevent side-to-side pitch or rolling movements.

It is therefore an object to provide an improved vehicular shock absorbing system for maintaining a frame of a vehicle substantially free from both shock and pitch.

It is another object to provide an improved vehicular shock absorbing system having a plurality of interconnected shock absorber members and in which the interconnections therebetween are free from mechanical power transmitting members.

Accordingly, my invention provides a shock absorbing system for a vehicle and including shock sensing means disposed at one end of the vehicle and a shock absorber, responsive to the sensing means, disposed at the other end of the vehicle. In one embodiment of the invention the shock absorber, which may be one of the type described in U.S. Patent 2,667,237 granted to J. Rabinow, includes a fluid, the viscosity of which is adjustable under the influence of a magnetic field, and a solenoid surrounding the fluid. The flow of current in the solenoid is electrically controlled by shock sensing means positioned at an end of the vehicle remote from the shock absorber. When, for example, one wheel of an automobile hits a bump, shock sensing means disposed at this wheel energises a shock absorber at an oppositely disposed wheel tightening the wheel-frame coupling at this oppositely disposed wheel.

My invention is described in greater detail in connection with the appended drawings in which like numerals refer to like parts, and wherein.

Figure 4:
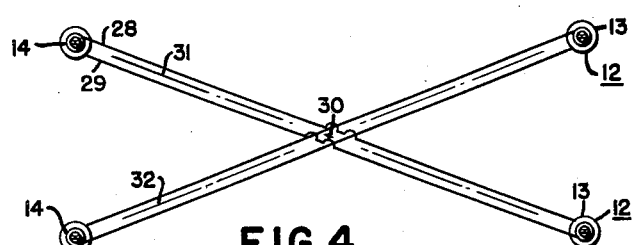
Figure 4 is a schematic illustration of the shock absorbing system of Figure 1.
Figure 5:
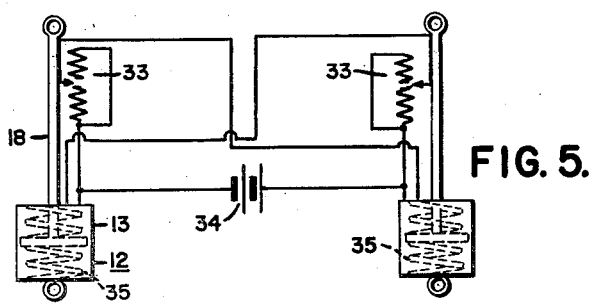
Figure 6:
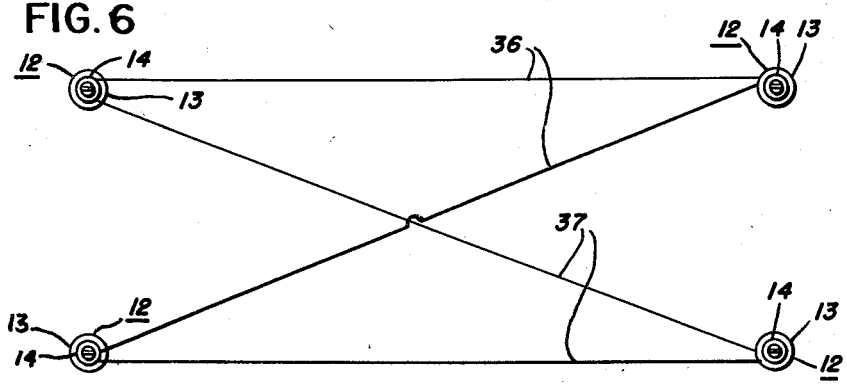
Figure 7:
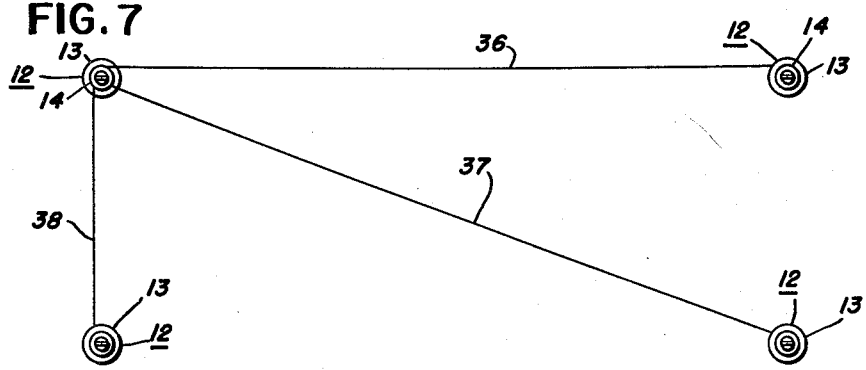
Figure 8:

Figure 5 is a partially schematic side elevational view of a portion of the shock absorbing system of a type similar to that depicted in Figure 4 and showing the electrical interconnections between a pair of combination shock absorber and shock sensing mechanisms; and Figures 6 to 8 are schematic illustrations of modifications of the shock absorbing system of Figure 4 and illustrate different aspects of the invention.

Figure 1:
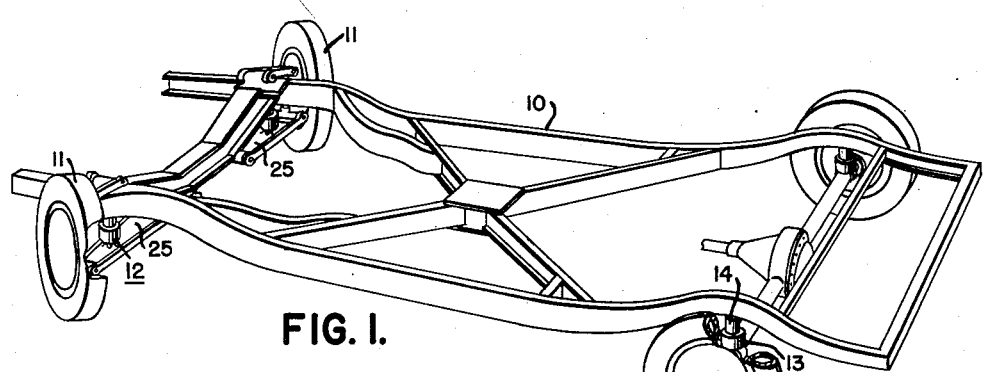
Figure 1 is an illustration of a portion of a vehicle employing a shock absorbing system of the invention.

There is shown in Figure 1 an illustration of a portion of an automobile utilizing an embodiment of the invention. The automobile has the usual frame 10 and support members in the form of wheels 11, which lie substantially in a horizontal plane, and is provided with a shock absorbing system according to the invention. The shock absorbing system includes a plurality of shock control members 12 each including a shock absorber element 13 and a shock sensing element 14.

Figure 2:
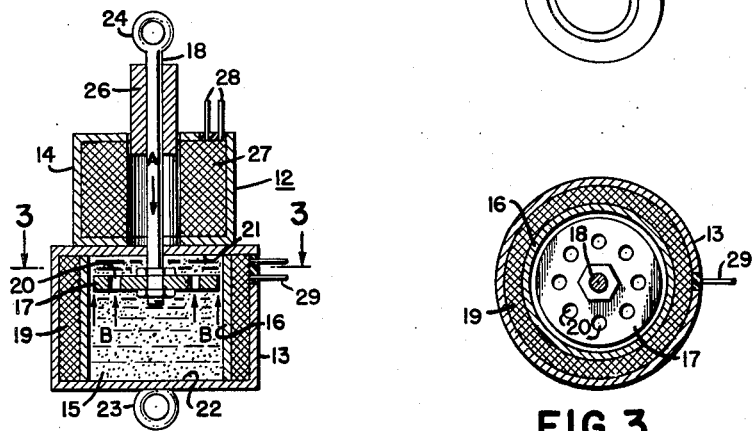
Figure 2 is a side elevational view of a combination shock absorber and shock sensing mechanism of the type used in the vehicle of Figure 1.
Figure 3:
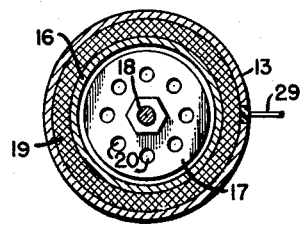
Figure 3 is a sectional view taken on line 3—3 of Figure 2.

As shown in Figures 2 and 3, the shock absorber element 13 is provided with a fluid 15 therewithin, the fluid comprising a colloidal suspension of magnetizable particles, such as magnetite ($Fe_3O_4$), in oil. Fluid suspensions of this character, which are known in the art and are described in greater detail in the aforementioned U.S. Patent No. 2,667,237, are ordinarily free flowing. But when a magnetic field is passed through such a suspension it ceases to be free flowing and becomes rigid. The suspension 15 is contained in a cylinder 16 of a non-magnetic material such as brass, the cylinder containing a piston 17 fixed to a piston rod 18. Around the cylinder 16 is disposed a first electrical coil or solenoid 19 for passing a magnetic field through the suspension 15. The piston 17 is provided with a plurality of apertures 20 to better enable the piston to pass through the suspension 15 when the solenoid 19 is unenergised. When the automobile wheel 11 (Figure 1) to which the shock control member 12 is fixed hits a bump and the wheel moves upward toward the frame 10, the piston 17 (Figure 2) moves in direction A and the suspension 15 moves through and past the piston in direction B. Each of the pistons 17, in the unenergised state of the shock absorber element 13, is held in a position intermediate the end walls 21 and 22 of the chamber within which the piston moves by means of spring elements (the spring elements may, for example, be of the type indicated at numeral 35 in Figure 5). The maintaining of the pistons in this position during their unenergised state assures that they have sufficient room in which to travel when the shock absorber elements in which the pistons are disposed are subjected to shocks. The same spring elements may also be used to gradually bring a piston to a stop as it approaches one of the end walls 21 or 22.

As shown in Figuress 1 and 2, each of the piston rods 18 is fixed, at the end 24 thereof extending outside the cylinder 16, to a portion of the automobile frame 10 adjacent to a wheel 11. Each of the cylinders 16 is fixed, at the end 23 thereof opposite the first named end 24, to an assembly 25 to which a wheel 11 is fixed. The wheel assembly 25 is ordinarily the axle or axle housing on which the wheel is mounted. Thus the shock control members 12 are each connected between the frame 10 and one of the wheels 11. If desired, the shock control members 12 may be connected to the frame and wheels in an inverted position, the pistons 17 fixed to the wheel assemblies 25 and the cylinders 16 fixed to the frame 10.

Each of the shock sensing elements 14 is an electrical generator and comprises a magnetic field producing element in the form of a magnet 26 fixed to the same piston rod 18 as that of the shock absorber. The magnet 26 is adapted to move with the rod 18 to which it is fixed and within a second solenoid 27, the second solenoid having an electric current produced therein when the magnet is in motion. The current produced in the second solenoid 27 is fed through output leads 28 to the input leads 29 of the shock absorber element 13 to be energized. If the output from the shock sensing element 14 is insufficient for energising a shock absorber element, the output from the sensing element may be used to control the energization of the shock absorber by means of a conventional relay (for controlling a heavier current input to the shock absorber) or amplifier.

Reference is now made to Figure 4. In this embodiment a shock control member (of the type aforementioned) has the shock absorber element and the shock sensing element thereof disposed at diagonally opposite ends of a vehicle. A vehicle having a frame such as that illustrated in Figure 1 is provided with four shock control members 12 each having a shock absorber element 13 and a shock sensing element 14. These elements 13 and 14 are connected between the wheel assemblies 25 and the frame 10 of the vehicle in the manner described with respect to Figures 1 to 3. Each shock sensing element 14 has the output leads thereof (represented in Figure 4 at numeral 28) connected to the input leads of the shock absorber element 13 at the diagonally opposite end of the vehicle (the input leads to a shock absorber element 13 being represented at numeral 29).

The operation of the circuit illustrated in Figure 4 will now be explained. When a wheel of an automobile, such for example as the right-front wheel, hits a sharp rise or bump in a road the automobile tends to oscillate around its center of gravity. When the right-front wheel moves upward it tends to move the portion of the frame adjacent thereto upward. Consequently, the frame tends to move around its center of gravity so that the diagonally opposite portion of the frame (i.e. the portion adjacent to the left-rear wheel) tends to move downward. Therefore, the energizing of each of the four shock absorber elements 13 is preferably controlled by the shock sensing element 14 which is disposed at the diagonally opposite wheel. Accordingly, diagonally opposite shock control members 12 are preferably disposed on opposite sides of the center of gravity 30 of the automobile and in vertical planes 31 and 32 passing through the center of gravity 30, the vertical planes lying perpendicular to the horizontal plane containing the wheels. The diagonally opposite connections not only substantially eliminate end-to-end pitching but also side-to-side or rolling pitch (e.g. the left side pitching down when the right side goes up). Another of the advantages of the diagonally opposite connections is that a servo effect is exhibited. In the event of a slight vertical movement of the pitch-dampened wheel, the movement is sensed by the wheel shock sensing element which in turn sends an electrical impulse back to the diagonally opposite wheel stiffening it to a small extent; thus oscillation of the automobile is substantially eliminated. While the shock absorbing system described has reference to one including a shock absorbing element having a magnetizable fluid, it is apparent that other types of shock absorber elements may instead be used provided the shock sensing element which energises the shock absorbing element is disposed on opposite sides of the center of gravity of the vehicle to be stabilized and the shock sensing and absorber elements are disposed substantially in a vertical plane passing through the center of gravity.

In actual practice the shock sensing element 14 of each wheel may be connected to the shock absorber element 13 of both of the wheels at the end of the auotmobile opposite the sensing element. This connection is illustrated in Figure 6 where the shock sensing elements 14 in the left of the figure are each shown connected by wires 36 and 37 to both of the shock absorber elements 13 at the other end of the automobile (the elements 13 at the right in Figure 6). This arrangement assures a more complete dampening of any pitching tendency of the end of the automobile opposite the one hitting the bump. In this case each of the sensing elements of the front wheels is connected to both rear wheels and the sensing elements of each rear wheel to both front wheels. To further dampen any tendency of the automobile to experience a side-to-side pitch as well as end-to-end pitch, the sensing element of each wheel may be connected to the shock absorber elements of all of the other wheels. This further dampening arrangement is illustrated in Figure 7 where the shock sensing element 14 in the upper left corner of the figure is shown connected by wires 36, 37, and 38 to the shock absorber elements 13 of all of the other shock control members 12. Also, a fraction of the output of each element may be fed back to the shock absorber element adjacent to it in order to avoid the production of a shock within the shock absorber element itself when the vehicle hits a relatively sharp bump, the travel of the piston within the shock absorber element being dampened when the piston approaches the end wall of the chamber containing it. This feedback arrangement is illustrated in Figure 8 where one of the shock control members 12 is shown with its shock sensing element 14 connected by a wire 39 to its shock absorber element. The output from each of the shock sensing elements may be adjusted so that no output current is presented to the shock absorbers until the experience of a shock exceeding a predetermined value. The use of the aforementioned arrangements reduces the need for conventional automobile springs to the extent that either the springs may be used only to supplement the action of the shock absorbing system or the conventional springs may be entirely eliminated from the automobile, the springs 35 (Figure 5) which are used to maintain the shock absorber pistons 17 in an intermediate position within the cylinder containing it being the only spring elements used.

As indicated in Figure 5, instead of the shock sensing element 14 of the generator type described with respect to Figures 2, 3, and 4, the shock sensing mechanism may be one (indicated by the rheostat members 33) which controls the current flow from an electrical source, indicated generally by a battery 34, in proportion to the severity of the shock experienced. If the shock sensing element takes the form of a rheostat 33, the rheostat is preferably arranged in two sections as shown, one section for increasing the current output when the piston moves in an upward direction in response to an upwardly directed shock, and the other section for increasing the output when the piston moves in a downward direction in response to a downwardly directed shock. While the sensing mechanism which controls the current flow from an electrical source may be in the form of the rheostat illustrated the mechanism may instead be any other one which provides a current output proportional to the movement of the wheel to which it is connected. As explained with respect to Figures 2, 3, and 4, the rheostat-like shock sensing mechanism 33 of Figure 5 is also preferably connected to the shock absorber element at the diagonally opposite portion of the vehicle in which it is used. However, as in the elements of the previous figures, the shock sensing mechanisms of the type in Figure 5 may each be connected only to the shock absorber element on the opposite end but on the same side of the vehicle (e.g. the right-front sensing mechanism to only the right-rear shock absorbing element). In the latter event the advantage of side-to-side pitch elimination would be lost.

The response of the shock absorber elements described may be varied by the use of different magnetic materials for the magnetizable particles within the fluid 15 (Figure 2) of the shock absorber elements. For example, the magnetizable particles within the fluid may be chosen of a material having a given coefficient of magnetic retentivity so as to allow a shock absorber element to remain rigid for a predetermined interval of time after the energising force is removed. Some of the magnetic materials known as ferrites may be used for this purpose.

While my invention has been described with respect to an automobile, it will be appreciated that it may be used in other types of vehicles. Thus, the shock absorbing system described may be used, for example, in such vehicles as tractors or tanks.

I claim:

1. A vehicle having sprung and unsprung parts and having a shock absorbing system, said system comprising shock sensing means sensitive to rate of change of relative motion between said parts and mounted at one end of said vehicle and a shock absorber element responsive to said sensing means and mounted at an end of said vehicle remote from said shock sensing means, said shock sensing means being mounted for movement in either of two opposite directions with substantially equal facility, said shock absorber element including a magnetic field producing element and a fluid disposed within the influence of said magnetic field producing element, said fluid being of the type having a viscosity which is increased under the influence of a magnetic field, the rigidity of said shock absorber element being determined by the viscosity of said fluid, said magnetic field producing element being connected to said shock sensing means, whereby the rigidity of said shock absorber element is controlled by said shock sensing means.

2. In a vehicle having a center of gravity, a shock absorbing system comprising a pair of shock sensing elements each sensitive to rate of change of motion and mechanically responsive thereto to produce an electrical output and adapted to be mounted at a portion of said vehicle opposite said center of gravity from the other, and a pair of shock absorber elements each adapted to be mounted at a portion of said vehicle adjacent to one of said shock sensing elements and electrically connected to be responsive to the other of said shock sensing elements.

3. In a vehicle having a plurality of support members lying substantially in one plane and having a center of gravity, a shock absorbing system comprising a pair of shock sensing elements each sensitive to rate of change of motion and mechanically responsive thereto to produce an electrical output and adapted to be mounted at a portion of said vehicle opposite said center of gravity from the other and in a plane including said center of gravity and perpendicular to said one plane, and a pair of shock absorber elements each adapted to be mounted adjacent to one of said shock sensing elements and electrically connected to be responsive to the other of said shock sensing elements.

4. A vehicle shock absorber system having sprung and unsprung parts comprising a pair of shock control members operably associated with said parts and each of said members including a shock sensing element sensitive to rate of change of relative motion between said parts and a shock absorber element of the type including means capable of exhibiting a change of magnetic state, each of said shock absorber elements responsive in said change of magnetic state to the shock sensing element of the other member.

5. A vehicle shock absorbing system having sprung and unsprung parts comprising a pair of shock control members operably associated with said parts each including shock sensing means and a shock absorber element responsive to the shock sensing means of the other member; each of said shock absorber elements having a solenoid for producing a magnetic field, and a fluid disposed within the influence of said magnetic field, the rigidity of each of said shock absorber elements being determined by the viscosity of the fluid thereof; each of the shock sensing means of said members including a magnet element and a coil element within the magnetic influence of said magnet element, the elements of each of said shock sensing means being moveable relative to each other for producing an electrical shock absorber element actuating impulse; the coil element of one of said shock control members being electrically connected to the shock absorber element of the other of said members, whereby the rigidity of the shock absorber elements of each member is controlled by the shock sensing means of the other.

6. A shock absorbing system for a vehicle having a frame and a plurality of vehicle support members, said system comprising an electrically actuable shock absorber adapted to be connected between said frame and one of said support members and at one end and at one side of said vehicle, and shock sensing means electrically connected to said shock absorber and adapted to be mounted at an end of said vehicle diagonally opposite said shock absorber, said shock sensing means being adapted to control an electrical output to said shock absorber in response to a shock.

7. A vehicle shock absorber system having sprung and unsprung parts comprising a pair of shock control members operably associated with said parts each including a shock sensing element sensitive to rate of change of motion and adapted to generate an electrical output proportional to said rate of change of motion and a shock absorber element adjacent to the shock sensing element of the same control member and responsive to the electrical output of the shock sensing element of the other member.

8. A vehicle shock absorber system having sprung and unsprung parts comprising: a pair of shock control members operably associated with said parts each including a shock sensing element sensitive to rate of change of motion, and a shock absorber element responsive to the shock sensing element of the other member, each of said shock absorber elements being controllable by a flow of electrical current therethrough, each of said shock sensing elements including a magnet and a coil within the magnetic influence of said magnet, the coil of each of said shock control members being electrically connected to the shock absorber element of the other of said members, said magnet and said coil of each of said members being moveable relative to each other for producing an electrical shock absorber controlling current.

9. In a vehicle having a plurality of support members lying substantially in one plane and having a center of gravity, a shock absorbing system comprising a pair of shock sensing elements each adapted to be mounted at a portion of said vehicle opposite said center of gravity from the other and in a plane including said center of gravity and perpendicular to said one plane, and a pair of shock absorber elements each adapted to be mounted adjacent to one of said shock sensing elements and responsive to the other of said shock sensing elements, each of said shock absorber elements including a magnetic field producing element and a fluid disposed within the influence of said magnetic field producing element, said fluid being of the type having a viscosity which is increased under the influence of a magnetic field, the rigidity of each of said shock absorber elements being determined by the viscosity of the fluid thereof, the magnetic field producing element of each shock absorber element being connected to said other of said shock sensing elements, whereby the rigidity of each of said shock absorber elements is controlled by the shock sensing element on the opposite side of said center of gravity.

References Cited in the file of this patent

UNITED STATES PATENTS

| | | |
|---|---|---|
| 1,976,951 | Lombard | Oct. 16, 1934 |
| 2,003,823 | Bucklen | June 4, 1935 |
| 2,247,749 | Venel | July 1, 1941 |
| 2,667,237 | Rabinow | Jan. 26, 1954 |
| 2,720,819 | Ryan | Oct. 18, 1955 |
| 2,846,028 | Gunther | Aug. 5, 1958 |

FOREIGN PATENTS

| | | |
|---|---|---|
| 728,631 | France | July 8, 1932 |
| 346,493 | Great Britain | Apr. 16, 1931 |